E. A. FRANKLIN
MATCH BOX.
APPLICATION FILED JAN. 2, 1916.
1,216,978. Patented Feb. 20, 1917.
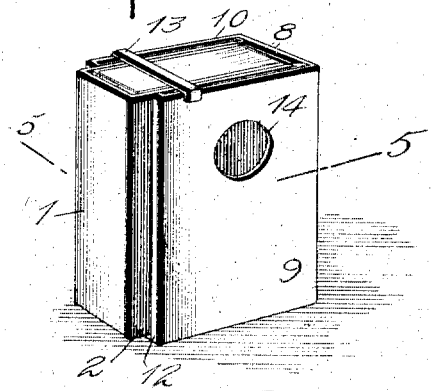
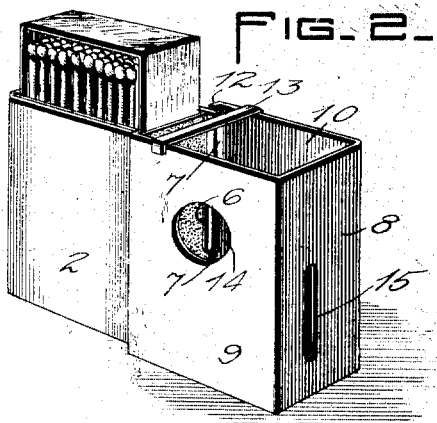
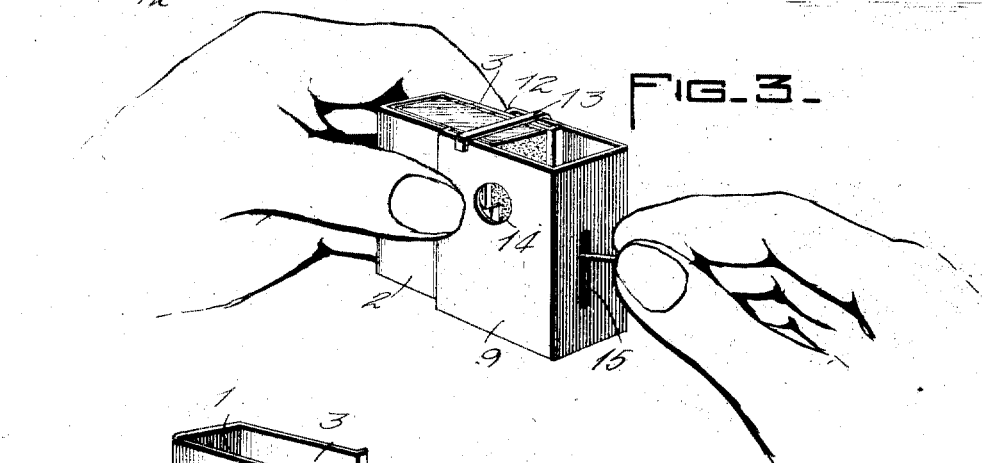
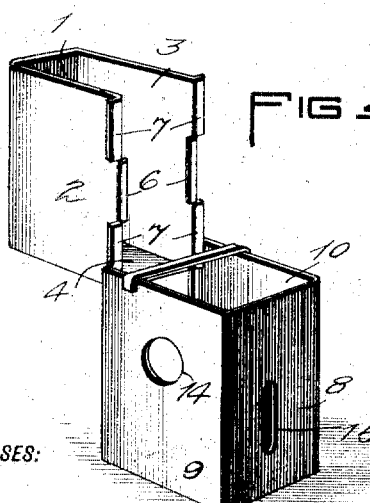
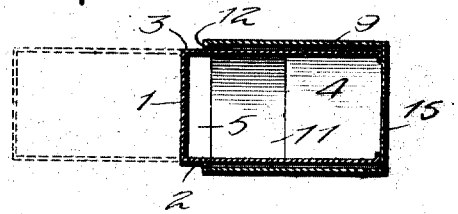
WITNESSES:
INVENTOR
EMLEN A. FRANKLIN,
BY Munn & Co
ATTORNEYS

UNITED STATES PATENT OFFICE.

EMLEN A. FRANKLIN, OF FORT MORGAN, COLORADO.

MATCH-BOX.

1,216,978.  Specification of Letters Patent.  Patented Feb. 20, 1917.

Application filed January 29, 1916. Serial No. 75,105.

*To all whom it may concern:*

Be it known that I, EMLEN A. FRANKLIN, a citizen of the United States, and a resident of Fort Morgan, in the county of Morgan and State of Colorado, have invented a new and useful Improvement in Match-Boxes, of which the following is a specification.

One of the objects of my invention is to provide a match box having a sliding cover, which in its extended position will form a wind shield, and so facilitate the lighting of a cigarette, pipe, etc., in a high wind.

A further object of my invention is to provide a holder for a standard commercial match box combined with a sliding cover forming such a wind shield.

A still further object of my invention is to provide such a wind shield with suitable openings through which a match may be inserted to engage a scratching surface, and at which a pipe, cigar, etc., may be lighted.

With these and other objects in view which will become apparent as the description proceeds, my invention resides in the constructions, combinations, and arrangement of parts to be hereinafter described and claimed, and illustrated in the accompanying drawings forming a part of this specification, and in which like reference characters indicate like parts throughout the several views.

Figure 1 is a perspective view of one embodiment of my invention in its closed position with a standard box of matches therein.

Fig. 2 is a similar view with the cover slid back to form a wind shield and the box of matches partially removed from the holder.

Fig. 3 is a similar view showing the wind shield in operative position and the method of using the device.

Fig. 4 is a similar view with the two members forming the match box partially separated to show the construction thereof.

Fig. 5 is a horizontal section on the line 5—5 of Fig. 1.

Referring to the drawings, a match box holder is shown formed of a single piece of sheet metal bent to form an end 1, front and rear walls 2 and 3 respectively and a base 4. The base 4 is cut away adjacent the closed end 1 of the holder, leaving an opening 5 through which the finger is inserted to push the match box from the holder.

The central portion of the ends of the front and rear walls 2 and 3, at the open end of the holder is bent inwardly, forming lips 6; and the ends of the front and rear walls of the holder above and below the lips 6 are bent outwardly forming lips 7.

The holder as above described is of a suitable size to hold a box of matches, with one end resting upon the base 4, and the sides thereof held between the end wall 1 and the lips 6 as clearly shown in the drawings.

The sliding cover for the match box holder comprises an end wall 8, front and rear walls 9 and 10 respectively, and a base 11. The ends of the front and rear walls at the open end of the cover are bent inwardly forming lips 12. A narrow band 13 extends across the open top of the holder near the open end of the same.

The cover being of a suitable size to fit snugly over the holder, the parts are assembled as shown in Fig. 4, the holder sliding within the cover and resting upon the base 11, and the lips 7 engaging the lips 12 to prevent the cover being slid completely from off the holder. When the device is in its closed position, as shown in Fig. 1, the box of matches within the holder will be prevented from dropping from the same by the band 13 extending across the top of the box.

An elongated slot 15 is formed in the end wall 8 of the cover, through which a match to be scratched upon the side of the box within the holder is inserted.

An opening 14, preferably round at which a pipe is adapted to be lighted, is formed in the front wall of the cover.

In operation a box of matches having been placed in the holder, when it is desired to light a match the cover is slid from the holder until the lips 7 engage the lips 12. A match is then inserted in the slot 15 and scratched upon the side of the box which is at the open end of the holder, as clearly shown in Fig. 3. The sides and bottom of the cover will now form an efficient wind shield to prevent the wind extinguishing the match, and a cigar or cigarette may be conveniently lighted by holding the same over the top of the cover. If it is desired to light a pipe the device is turned on its side with the opening 14 over the bowl of the pipe.

It will thus be seen that I have provided a compact, convenient, match holder having a cover, which when extended will form an efficient wind shield.

It should be noted that while I have described my invention as embodying a holder for a standard match box, a holder for loose matches having a sliding cover such as I have described could be used without departing from the spirit of my invention, the scope of which is commensurate with the claims appended hereto.

I claim:—

1. A match box carrier comprising a holder consisting of an end wall, side walls, and a base partially closing the bottom of the said holder, the central portion of the ends of the side walls at the open end of the holder being inwardly bent to form retaining lips, and the remaining portion of the said ends of the side walls being outwardly bent to form stops, a cover for the said holder consisting of an end wall, side walls, and a base, the ends of the side walls at the open end of the cover being inwardly bent to form stops, a retaining band extending across the open top of the said cover, the said cover having an elongated slot in its end wall, and an aperture adapted to extend over the top of the bowl of a pipe in one of the side walls, the said cover fitting over the said holder with its end wall adjacent the open end of the holder, and its sides lying over the sides of the holder, the said cover being adapted to slide upon the said holder, and being limited in its outward movement by the stops upon the same engaging the outwardly bent stops upon the said holder.

2. A match box carrier comprising a holder consisting of an end wall, side walls, and a base partially closing the bottom of the said holder, retaining means upon the said side walls for holding a match box within the said holder, a cover for the said holder sliding upon the same, and adapted when in its extended position to form a wind shield as and for the purpose specified.

3. A device of the character specified, comprising a holder having an open end, portions of the said open end being inwardly bent to form retaining lips, portions of the said open end being outwardly bent to form stops, a cover for the said holder having an open end and adapted to slide thereon, the said open end having lips adapted to coact with the above mentioned stops to limit the outward movement of the said cover.

4. A match box carrier comprising a holder having a base partially closing the bottom of the said holder, a cover open at its top, adapted to slide upon the said holder, and a retaining band extending across the open top of the said cover, as and for the purpose specified.

5. The combination with a match holder of a sliding cover therefor forming a wind shield in its extended portion, the said cover having an opening in its side adapted to extend over the top of the bowl of a pipe, and a slot in its end so positioned that a match inserted therein will be above the said opening.

6. A match box carrier comprising a holder, a cover for the same adapted to slide thereon and form a wind shield in its open position, coacting means upon the said holder and cover to limit the outward movement of the latter, and coacting means upon the top and bottom respectively of the said cover and holder to retain a match box within the said holder.

7. A match box carrier comprising a holder having a partially open base and an open top and adapted to hold a match box with one end adjacent the said base, and a cover adapted to slide upon the said holder.

8. A match box carrier comprising a holder having an open end and a sliding cover for the same having an open end, means at the open end of the said holder for retaining a match box therein and coacting means at the said open ends of the holder and cover to limit the outward movement of the latter.

9. A match box carrier comprising a holder, a cover adapted to slide thereon, and coacting means upon the top and bottom respectively of the said cover and holder to retain a match box within the said holder.

EMLEN A. FRANKLIN.

Witnesses:
H. S. BARRINGER,
H. H. SANDMANN.